United States Patent
Sporre

(10) Patent No.: US 6,663,112 B1
(45) Date of Patent: Dec. 16, 2003

(54) SEALING DEVICE

(75) Inventor: Sten Sporre, Falkenberg (SE)

(73) Assignee: Enebacken Skrea AB, Falkenberg (SE)

(*) Notice: Subject to any disclaimer, the term of this patent is extended or adjusted under 35 U.S.C. 154(b) by 0 days.

(21) Appl. No.: 09/980,209

(22) PCT Filed: May 10, 2000

(86) PCT No.: PCT/SE00/00919
§ 371 (c)(1),
(2), (4) Date: Mar. 19, 2002

(87) PCT Pub. No.: WO00/73690
PCT Pub. Date: Dec. 7, 2000

(30) Foreign Application Priority Data

May 31, 1999 (SE) .............................. 9902012

(51) Int. Cl.⁷ .............................................. F16L 17/00
(52) U.S. Cl. ..................... 277/611; 277/584; 277/638
(58) Field of Search .............................. 277/611, 626, 277/644, 638, 651, 905, 584

(56) References Cited

U.S. PATENT DOCUMENTS

| | | | |
|---|---|---|---|
| 2,430,836 A | * 11/1947 | Taylor .......................... | 384/16 |
| 3,445,120 A | 5/1969 | Barr | |
| 3,561,776 A | * 2/1971 | Wilson ......................... | 277/647 |
| 3,918,726 A | * 11/1975 | Kramer ........................ | 277/651 |
| 4,487,421 A | * 12/1984 | Housas et al. ............... | 277/616 |
| 4,779,903 A | * 10/1988 | Maier et al. ................. | 285/336 |
| 4,789,167 A | * 12/1988 | Housas ........................ | 277/616 |
| 5,326,138 A | * 7/1994 | Claes et al. .................. | 285/110 |
| 5,360,218 A | * 11/1994 | Percebois et al. ........... | 277/619 |
| 5,622,371 A | * 4/1997 | Angelo et al. ............... | 277/329 |
| 5,845,909 A | * 12/1998 | Angelo et al. ............... | 277/308 |
| 5,988,695 A | * 11/1999 | Corbett, Jr. .................. | 285/110 |
| 6,305,483 B1 | * 10/2001 | Portwood .................... | 175/371 |

FOREIGN PATENT DOCUMENTS

| | | | |
|---|---|---|---|
| DE | 1 187 434 | 2/1965 | |
| DE | 2 249 619 | 5/1974 | |
| DE | 25 03 807 | 7/1975 | |
| FI | 92749 | 7/1994 | |
| GB | 2069630 A | * 8/1981 | ............ F16J/15/12 |

* cited by examiner

Primary Examiner—William L. Miller
(74) Attorney, Agent, or Firm—Browdy and Neimark, P.L.L.C.

(57) ABSTRACT

A sealing device for sealing a joint which is constituted by two sealing surfaces facing each other. The sealing surfaces are displaceable in parallel in relation to each other. The sealing device comprises a sealing element consisting of elastomeric materials of at least two different hardnesses. The sealing element is compressed in the joint while contacting the sealing surfaces. The sealing element forms two portions of elastomeric material having low hardness, said portions contacting the sealing surfaces. The elastomeric material having high hardness is positioned between the portions having low hardness and contacting the sealing surfaces. The elastomeric material having low hardness and contacting the sealing surfaces. The elastomeric material having high hardness is adapted at parallel displacement of the sealing surfaces from the position for forming the joint to increase its size in a direction transversely in relation to the sealing surfaces.

5 Claims, 4 Drawing Sheets

SEALING DEVICE

REFERENCE TO RELATED APPLICATIONS

The present application is the national stage under 35 U.S.C. 371 of international application PCT/SE00/00919, filed May 10, 2000 which designated the United States, and which international application was published under PCT Article 21 (2) in the English language.

BACKGROUND OF THE INVENTION

1. Technical Field of the Invention

The present invention relates to a sealing device for sealing a joint constituted by two sealing surfaces facing each other.

The sealing device according to the invention is intended for sealing a joint in which the sealing surfaces are displaceable in parallel with each other. Such a joint can for example be constituted by a joint between two pipe end portions in which the pipe end portions are provided with a socket and a spigot end and the joint is constituted between the substantially cylindrical inner surface of the socket and the substantially cylindrical outer surface of the spigot end introduced into the socket. The sealing device according to the invention comprises a sealing element formed by elastomeric materials of at least two different hardnesses, the sealing element being compressed in the joint while contacting the sealing surfaces.

2. Prior Art

In a sealing device of said kind it is desirable that the sealing device shall prevent or at least counteract displacement of the sealing surfaces from the position in which the sealing surfaces form said joint. In a pipe joint for this purpose it is previously known to use a roller sealing ring having a drop-shaped cross-section, the roller sealing ring having subsequently to the establishment of the pipe joint its smallest dimension positioned transversely to the sealing surfaces in the joint between the sealing surfaces. When making an attempt to displace the sealing surfaces from the position in which the sealing surfaces constitute the joint there is established a resistance because of the fact that the sealing ring rolls against a position in which it has its largest dimensions of the cross-section.

OBJECT AND SUMMARY OF THE INVENTION

The object of the invention is to provide an improved sealing device of the kind which prevents or obstructs displacement of the sealing surfaces from the position in which the sealing surfaces form the joint.

In order to comply with this object the sealing device according to the invention is characterized by the fact that the sealing element forms two portions of elastomeric material having low hardness, said portions engaging the sealing surfaces, that the elastomeric material having high hardness is positioned between the portions having low hardness and contacting the sealing surfaces and that the elastomeric material having high hardness is adapted at parallel movement of the sealing surfaces from the position for forming the joint to increase its size in a direction transversely in relation to the sealing surfaces.

In a sealing device of this kind the efficiency of the sealing device is improved with regard to the sealing of the joint as well as the capacity of preventing parallel displacement of the sealing surfaces from the position in which the sealing surfaces form the joint. The improved sealing efficiency is provided by the fact that the sealing element contacts and engages the sealing surfaces with elastomeric material having low hardness which provides that the sealing element closely adapts to irregularities of the sealing surface and in spite of such irregularities provide for an efficient sealing. Because of the fact that the elastomeric material having high hardness is used for preventing a parallel displacement of the sealing surfaces from the position forming the joint such displacement is prevented with greater efficiency. In previously known sealing devices one has been referred to provide a compromise between low hardness of the elastomeric material for providing an efficient sealing and a high hardness of the elastomeric material in order to prevent said displacement of the sealing surfaces from the position in which the sealing surfaces define the joint.

The sealing device according to the invention can be designed in different ways. In one embodiment the elastomeric material having high hardness forms two portions which at the displacement of the sealing surfaces from the position for forming the joint are displaced towards each other and by acting on each other are displaced against one sealing surface each. Thereby the portions having high hardness can be adapted to act on each other by cooperation between substantially parallel, concentric, conical surfaces.

In another embodiment of the sealing device according to the invention the elastomeric material having high hardness forms one or several portions which in section have different dimensions in different directions. Thereby, the sealing device is adapted at displacement of the sealing surfaces from the position for forming the joint to change its position from a position in which the elastomeric material portions having high hardness present small dimensions perpendicular to the sealing surfaces into a position in which the portions having high hardness present larger dimensions perpendicular to the sealing surfaces. In this embodiment the elastomeric material having high hardness can in the sealing element form a portion formed as a layer or several portions formed as layers. In the position in which the sealing surfaces form the joint the portions forming the layers take a position in which they are substantially parallel with the sealing surfaces. At an attempt to displace the sealing surfaces from the position in which the surfaces define the joint the portions forming the layers are rotated towards a position in which the layers take a more transverse relationship to the sealing surfaces which prevents or counteracts the displacement of the sealing surfaces from the position in which they form the joint.

In another embodiment of the sealing device according to the invention the sealing surfaces have sections with greater and smaller distances between the sealing surfaces. Thereby, the portion consisting of elastomeric material with great hardness is adapted at the parallel displacement of the sealing surfaces from the position for forming the joint to be displaced from a section having a large distance between the sealing surfaces towards a section having less distance between the sealing surfaces. In this embodiment the sealing element can comprise a portion with a low hardness contacting one of the sealing surfaces and a portion connected therewith and foldable against this. Subsequently to the folding the foldable portion has a portion having low hardness contacting the other sealing surface and a portion with high hardness positioned between the portions having low hardness. The sealing device according to this embodiment is especially well suited to be used in a joint between a socket and a spigot end of two pipe end portions.

In the sealing device according to the invention it is also possible to design the elastomeric material having high hardness as one or several portions which are folded when the sealing surfaces are displaced in parallel to the position for forming the joint. Thereby these foldable portions will take a somewhat folded position in the joint. When the sealing surfaces are displaced in parallel from the position for forming the joint this displacement is counteracted by the fact that the folded portions are displaced towards a raised-up position. In the last-mentioned embodiment the elastomeric material having high hardness can have for example an L-shaped, a U-shaped, an I-shaped or a X-shaped cross section.

BRIEF DESCRIPTION OF THE DRAWINGS

Some different embodiments of the sealing device according to the invention shall in the following be described with reference to the accompanying drawings.

FIGS. 4a and 4b show a further embodiment of a sealing device according to the invention included in a pipe joint constituted by a socket and a spigot end, in which FIG. 4a shows the sealing element included in the sealing device in a first position prior to the establishment of the pipe joint and FIG. 4b shows the sealing device subsequently to the establishment of the pipe joint.

DETAILED DESCRIPTION OF THE PREFERRED EMBODIMENT(S) OF THE INVENTION

Figure 1:
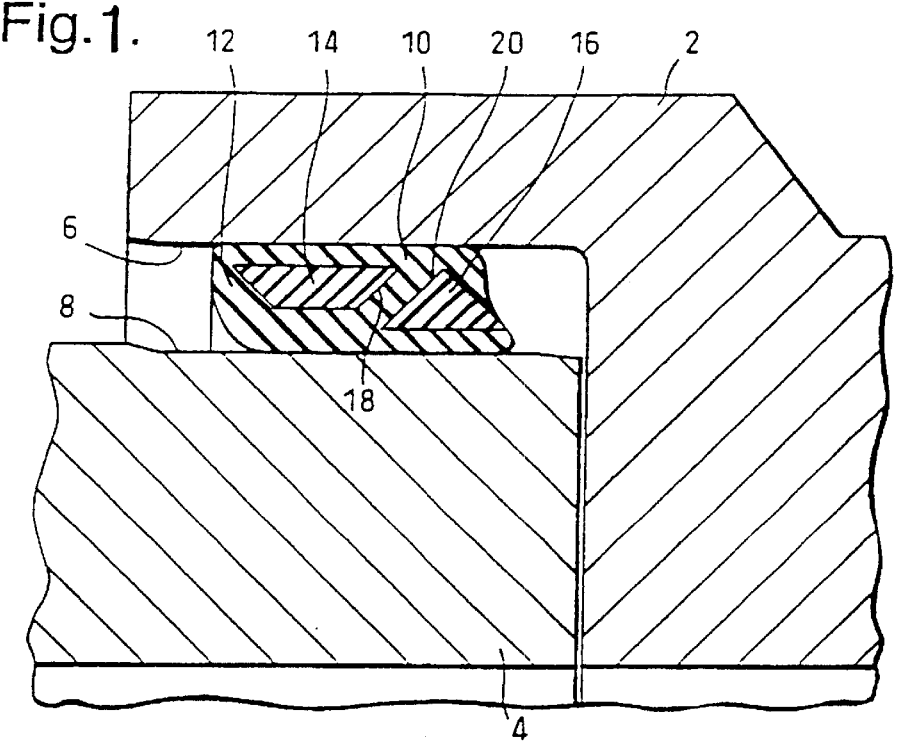
FIGS. 1–3 show different embodiments of the sealing device according to the invention in which the sealing device is included in a pipe joint constituted by a socket and a spigot end.

FIG. 1 shows a part of a socket 2 and a spigot end 4 introduced therein, in which the socket 2 has an inner, substantially cylindrical sealing surface 6 and the spigot end 4 has an outer, also substantially cylindrical sealing surface 8. The joint between the sealing surfaces 6 and 8 is sealed by means of a sealing element in the form of a sealing ring 10 consisting of a portion 12 of soft rubber and two portions 14 and 16 of hard rubber. The sealing ring 10 is compressed between the sealing surfaces 6 and 8, and the soft rubber of the portion 12 provides for good tightness even if the sealing surfaces are provided with irregularities.

The portions 14 and 16 of the sealing ring and consisting of hard rubber have the object of preventing that the joint comprising the sealing surfaces 6 and 8 and the sealing ring 10 is separated by displacing the spigot end 4 out of the socket 2.

Prior to the establishment of the pipe joint the sealing ring 10 is tensioned onto the sealing surface 8 of the spigot end 4, and when the spigot end 4 is introduced into the socket 2 the sealing ring 10 is compressed between the sealing surfaces 6 and 8. During the introduction of the spigot end 4 into the socket 2 the portions 14 and 16 consisting of hard rubber are displaced from each other which facilitates the introduction of the spigot end 4 into the socket 2. At attempts to displace the spigot end 4 out from the socket subsequently to the pipe jointing the portions 14 and 16 consisting of hard rubber are displaced towards each other, the conical surfaces 18 and 20 of the portions 14 and 16 thereby providing that the portions 14 and 16 are displaced against one of the sealing surfaces 6 and 8 each. This provides for an increased pressing of the soft rubber of the portion 12 against the sealing surfaces which prevents that the spigot end 4 is moved out of the socket 2.

Figure 2:
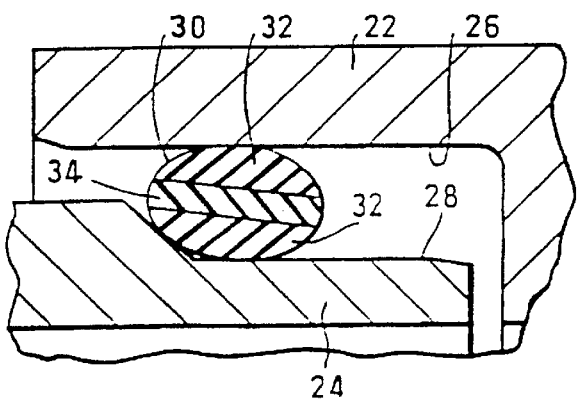

Also the sealing device shown in FIG. 2 is positioned between a socket 22 and a spigot end 24 introduced therein. The socket 22 has an inner, cylindrical sealing surface 26 and the spigot end 24 has an outer, cylindrical sealing surface 28. A sealing element in the form of a sealing ring 30 is positioned between the sealing surfaces 26 and 28, the sealing ring having two portions 32 of soft rubber and a layer 34 of hard rubber positioned between the portions 32.

At an attempt to move the spigot end 24 out from the socket 26 the sealing ring 30 rotates which provides that the layer 34 of hard rubber is rotated towards a position transversely in relation to the sealing surfaces 26 and 28 which prevents or at least to a large extent counteracts the movement of the spigot end 24 from the socket 26.

Figure 3:
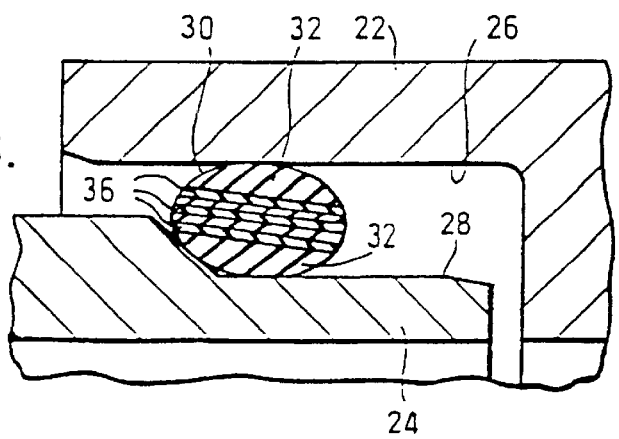

The embodiment of the sealing device according to the invention shown in FIG. 3 is in substantial agreement with the embodiment according to FIG. 2 with the difference that the sealing ring 30 instead of one layer of hard rubber has three parallel layers 36 of hard rubber. The function of the sealing ring 30 in the embodiment according to FIG. 3 is in substantial agreement with the function of the sealing ring according to the embodiment of FIG. 2.

Figure 4A:
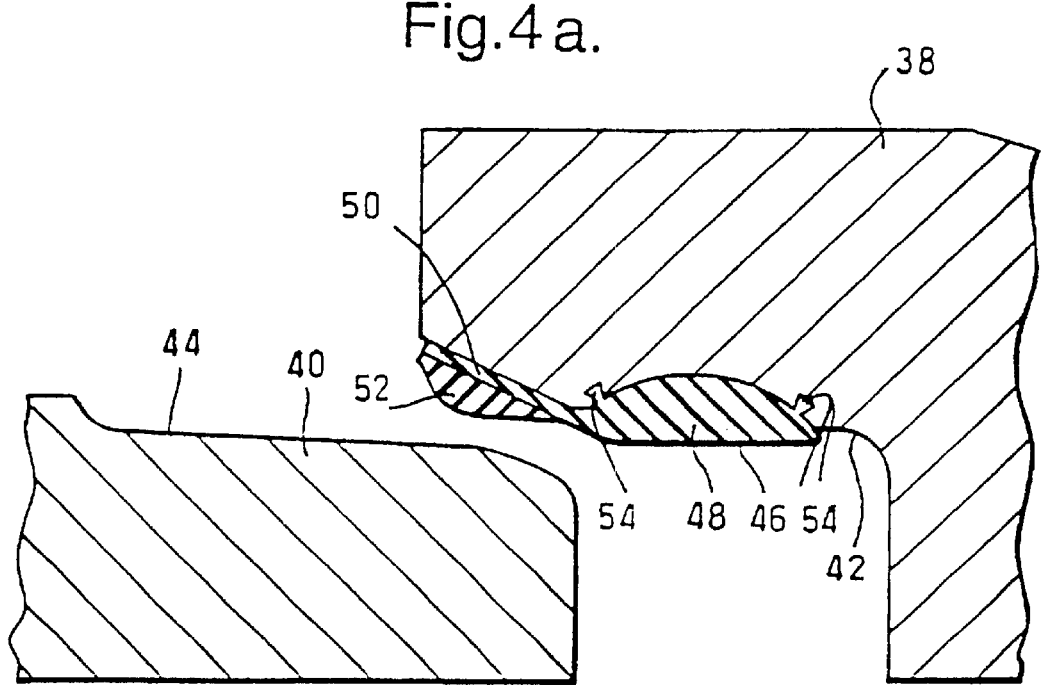

Also the embodiment of the sealing ring according to the invention shown in FIG. 4a the sealing ring is included into a socket 38 and a spigot end 40 in which the socket has an inner, cylindrical sealing surface 42 and the spigot end 40 has an outer cylindrical sealing surface 44. A sealing ring 46 is moulded into the socket 38 at the sealing surface 42 thereof, and the sealing ring 46 consists of two portions 48 and 50 of soft rubber and a portion 52 of hard rubber. The portion 48 of soft rubber is by means of retainer portions 54 moulded into the material forming the socket 38.

Figure 4B:
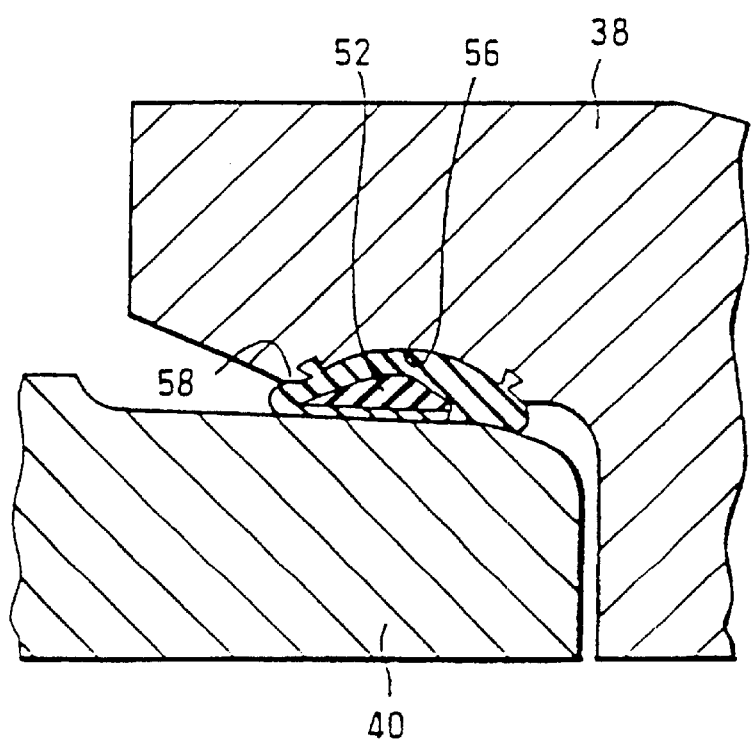

Prior to the pipe jointing the portion 50 and the portion 52 connected therewith are folded against the portion 48 of the sealing ring to the position shown in FIG. 4b, in which the portion 52 of hard rubber engages the portion 48 of soft rubber. Subsequently to the introduction of the spigot end 40 into the socket 38 the sealing ring 46 is compressed between the sealing surfaces as shown in FIG. 4b. The sealing surface 42 forms a groove 56 in which the sealing ring is received and at an attempt to displace the spigot end 40 from the socket 38 the portion 52 of hard rubber of the sealing ring 46 will prevent or to a large extent counteract the withdrawal of the spigot end from the socket by the fact that the portion 52 is displaced towards the inwardly directed, annular portion 58 of the sealing surface 42.

Figure 5:
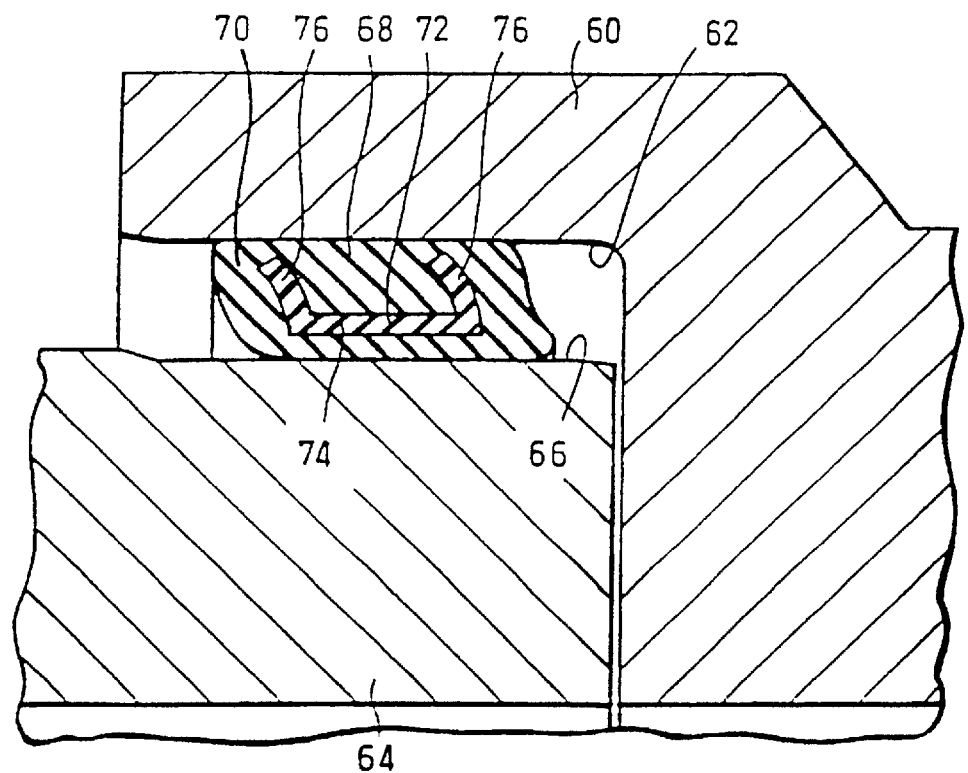
FIGS. 5–8 show further embodiments of the sealing device according to the invention in which the sealing device is included in a pipe joint constituted by a socket and spigot end.

The embodiment of the sealing device according to the invention shown in FIG. 5 comprises a socket 60 having an inner, substantially cylindrical sealing surface 62 and a spigot end 64 having an outer, substantially cylindrical sealing surface 66. A sealing ring 68 is compressed between the sealing surfaces 62 and 66. The sealing ring 68 has a portion 70 consisting of soft rubber and a U-shaped portion 72 consisting of hard rubber. The U-shaped portion 72 has a web portion 74 and two legs 76 extending outwardly therefrom.

Prior to the pipe jointing the legs 76 extend perpendicular to the web portion 74 but in connection the pipe jointing, i.e. when the spigot end 64 is introduced into the socket 60, the legs 76 are folded or bent relative to web portion 74 to the position shown in FIG. 5.

At an attempt to withdraw the spigot end 64 from the socket 60 this is prevented or counteracted by the fact that the legs 76 are thereby straightened out to a perpendicular position in relation to the web portion 74 which increases the dimensions of the sealing ring transversely in relation to the sealing surfaces 62 and 66.

Figure 6:
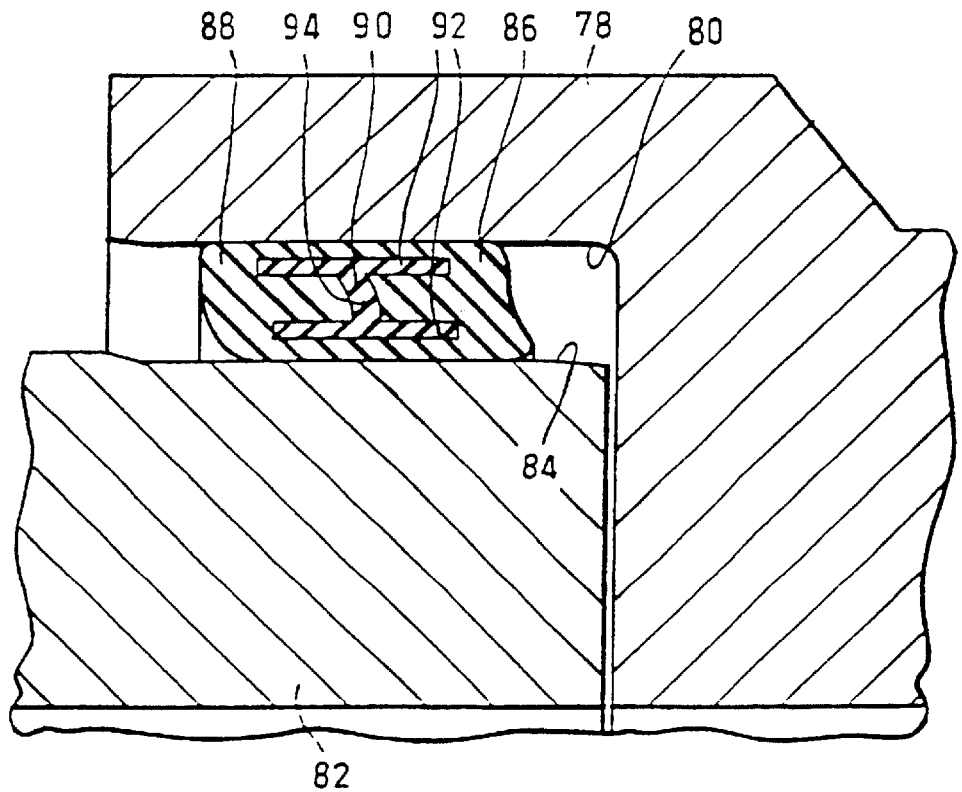

Also the embodiment of the sealing device according to the invention shown in FIG. 6 is positioned in a joint between a socket 78 having an inner, cylindrical sealing surface 80 and a spigot end 82 having an outer, substantially cylindrical sealing surface 84. A sealing ring 86 is compressed between the sealing surfaces 80 and 84. The sealing ring 86 consists of a portion 88 of soft rubber and a I-shaped portion 90 of hard rubber positioned in the portion 88. The portion 90 has two portions 92 which extend parallel with the sealing surfaces 80 and 84 and a portion 94 connecting the portions 92 and extending prior to the pipe jointing transversely in relation to the sealing surfaces 80 and 84. At the pipe jointing the portion 94 is deflected, folded or bent relative to port ions 92 as shown in FIG. 6, and at an attempt to withdraw the spigot end 82 from the socket 78 this is prevented or at least counteracted by the fact that the portion 94 acts for being straightened from its bent position.

Figure 7:
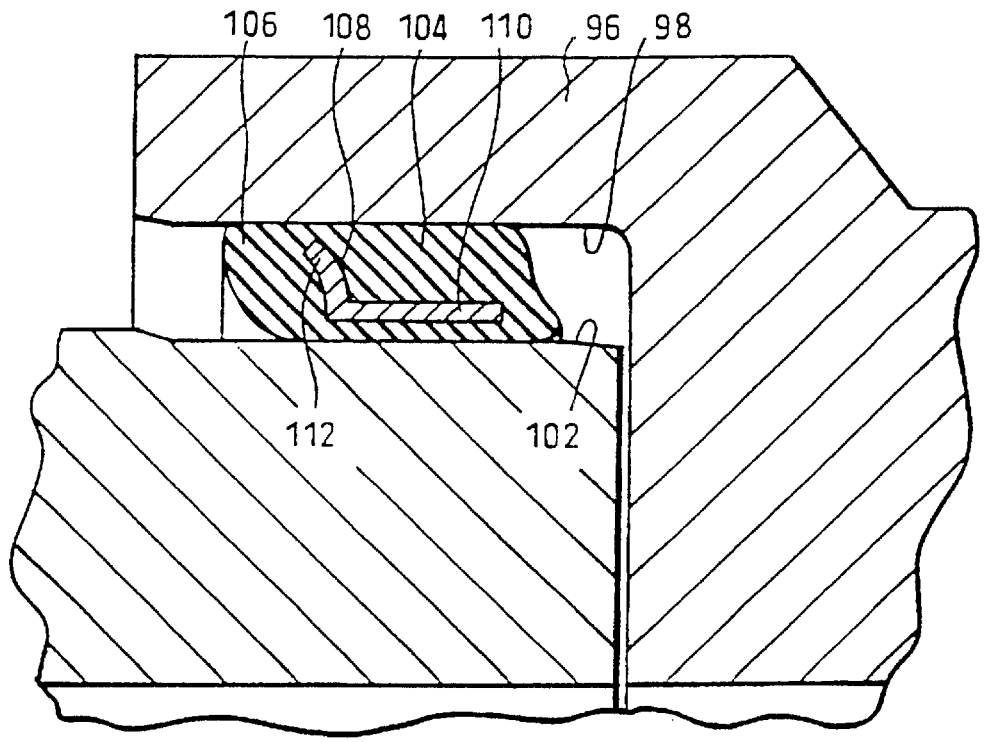

Also the embodiment of the sealing device according to the invention shown in FIG. 7 is included into a socket 96 having an inner, cylindrical sealing surface 98 and a spigot end 100 having an outer, cylindrical surface 102 introduced into the socket 96. A sealing ring 104 is compressed between the sealing surfaces 98 and 102. The sealing ring 104 comprises a portion 106 consisting of soft rubber and an L-shaped portion 108 consisting of hard rubber and positioned in the portion 106. The portion 108 has a portion 110 extending parallel with the sealing surface 102 and a portion 112 which prior to the pipe jointing forms a right angle with the portion 110. Subsequently to the pipe jointing the portion 112 takes a deflected, folded or bent position relative to portion 110 as shown in FIG. 7. At an attempt to withdraw the spigot end 100 from the socket 96 this is prevented or counteracted by the fact that the portion 110 acts be straightened and thereby increases its dimensions in a direction transversely of the sealing surfaces 98 and 102.

Figure 8:
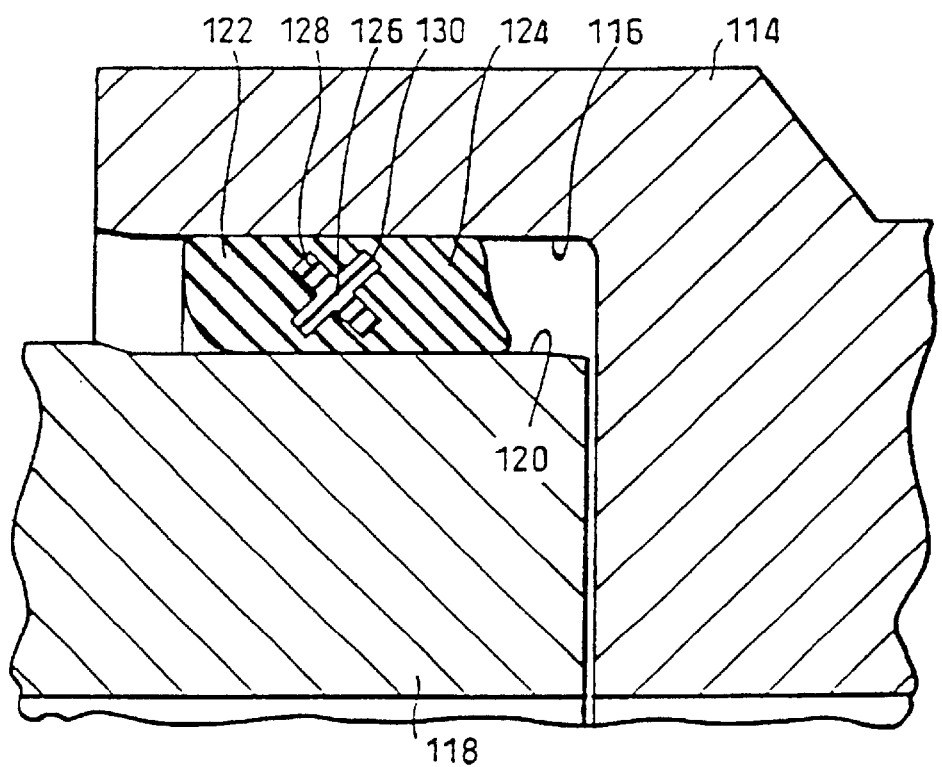

Also the embodiment of the sealing device according to the invention shown in FIG. 8 is included into a socket 114 having an inner, cylindrical sealing surface 116 and a spigot end 118 having an outer, substantially cylindrical sealing surface 120. A sealing ring 122 is compressed between the sealing surfaces 116 and 120. The sealing ring 122 has a portion 124 consisting of soft rubber and a portion 126 consisting of hard rubber and having a cross-shaped section. Prior to the pipe jointing one of the parts 128 extends transversely in relation to the sealing surfaces 116 and 120 while the other portion 130 extends in parallel with the sealing surfaces 116 and 120. Sub-sequently to the pipe jointing the portion 126 of hard rubber takes the position shown in FIG. 8 and at an attempt to withdraw the spigot end 118 from the socket 114 the hard rubber portion 126 acts for returning to the position prior to the pipe jointing, i.e. the portion 128 increases its dimension in a direction transversely of the sealing surfaces 116 and 120 which prevents or least counteracts said withdrawal of the spigot end.

In the device according to the invention the engagement of the soft elastic material of the sealing elements provide for a good sealing efficiency at the same time as the sealing elements prevent that the sealing surfaces are displaced from the position for forming the joint.

The invention can be modified within the scope of the following claims.

What is claim is:

1. A sealing device for sealing a pipe joint constituted by two cylindrical sealing surfaces (62, 66; 80, 84; 98, 102) facing each other and being displaceable in a first direction in parallel with each other to a pipe joint forming position, the sealing device comprising a sealing element (68; 86; 104) which is compressed between the two cylindrical sealing surfaces in the pipe joint forming position, the sealing element having two portions a first portion consisting of elastomeric material of low hardness for engaging the two cylindrical sealing surfaces in the pipe joint forming position, said first portion substantially fixed in a stationary position against the two cylindrical sealing surfaces during displacement in said first direction to said pipe joint forming position and a second portion (72; 90; 108), consisting of an elastomeric material of high hardness which is positioned within said first portion, the second portion having at least one first leg (76; 90; 112), which extends substantially transversely in relation to the two cylindrical sealing surfaces before the sealing element is compressed between the sealing surfaces during said diplacement thereof in said first direction to the pipe joint forming position and which is bent to a bent state relative to at least one second leg during said displacement of the sealing surfaces to the pipe joint forming position, said at least one first leg in said bent state obstructing parallel displacement of the sealing surfaces from the pipe joint forming position in a second direction opposite to said first direction by being raised from said bent state.

2. A sealing device as claimed in claim 1, wherein the cross-section of said second portion (108) has the form of an L, one leg (112) of which forming said at least one first leg.

3. A sealing device as claimed in claim 1, wherein the cross-section of said second portion (72) has the form of a U, the legs (76) of which forming said at least one first leg.

4. A sealing device as claimed in claim 1, wherein the cross-section of said second portion (90) has the form of an I, a vertical leg (94) of which forming said at least one first leg.

5. A sealing device as claimed in claim 1, wherein the cross-section of said second portion (90) has the form of an I, horizontal legs (92) of which forming said at least one second leg.

* * * * *